(12) United States Patent  
Greig

(10) Patent No.: US 8,126,220 B2  
(45) Date of Patent: Feb. 28, 2012

(54) ANNOTATING STIMULUS BASED ON DETERMINED EMOTIONAL RESPONSE

(75) Inventor: Darryl Greig, Bristol (GB)

(73) Assignee: Hewlett-Packard Development Company L.P., Houston, TX (US)

( * ) Notice: Subject to any disclaimer, the term of this patent is extended or adjusted under 35 U.S.C. 154(b) by 986 days.

(21) Appl. No.: 11/799,780

(22) Filed: May 3, 2007

(65) Prior Publication Data

US 2008/0275830 A1    Nov. 6, 2008

(51) Int. Cl.
*G06K 9/00* (2006.01)
(52) U.S. Cl. .................................................... 382/118
(58) Field of Classification Search .................. 382/118
See application file for complete search history.

(56) References Cited

U.S. PATENT DOCUMENTS 5,676,138 A * 10/1997 Zawilinski ................. 600/301

(Continued)

OTHER PUBLICATIONS

Tsai et al., Variation Among European American in Emotional Facial Expression, Journal of Cross-Cultural Psychology, vol. 34, No. 6, Nov. 2003, pp. 650-657.*

*Primary Examiner* — David Zarka

(57) ABSTRACT

A method of annotating audio-visual data is disclosed. The method includes detecting a plurality of facial expressions in an audience based on a stimulus, determining an emotional response to the stimulus based on the facial expressions and generating at least one annotation of the stimulus based on the determined emotional response.

16 Claims, 4 Drawing Sheets

U.S. PATENT DOCUMENTS

| | | | |
|---|---|---|---|
| 6,099,319 A * | 8/2000 | Zaltman et al. | 434/236 |
| 6,585,521 B1 * | 7/2003 | Obrador | 434/236 |
| 6,879,709 B2 * | 4/2005 | Tian et al. | 382/118 |
| 7,003,139 B2 * | 2/2006 | Endrikhovski et al. | 382/118 |
| 7,055,101 B2 * | 5/2006 | Abbott et al. | 715/744 |
| 7,154,510 B2 * | 12/2006 | Simon et al. | 345/619 |
| 7,174,029 B2 * | 2/2007 | Agostinelli et al. | 382/100 |
| 7,271,809 B2 * | 9/2007 | Fedorovskaya et al. | 345/581 |
| 7,821,409 B2 * | 10/2010 | Ishida | 340/576 |
| 7,953,254 B2 * | 5/2011 | Seo | 382/118 |
| 2004/0210159 A1 * | 10/2004 | Kibar | 600/558 |
| 2005/0289582 A1 * | 12/2005 | Tavares et al. | 725/10 |
| 2006/0128263 A1 * | 6/2006 | Baird | 446/321 |
| 2006/0143647 A1 * | 6/2006 | Bill | 725/10 |
| 2007/0066916 A1 * | 3/2007 | Lemos | 600/558 |
| 2010/0211397 A1 * | 8/2010 | Park et al. | 704/276 |

* cited by examiner

ANNOTATING STIMULUS BASED ON DETERMINED EMOTIONAL RESPONSE

BACKGROUND

Large increases in the quantity of audio-visual data have spawned a new class of problems related to searching, indexing and rating such data. For example, for a given audio-visual stimulus such as a movie, acquiring such data as emotive audience response (happy, sad, afraid, disgusted, bored, etc) as well as a general measure of the strength of audience response can assist in providing a search and index system for that movie, as well as a rating guide to compare with other movies. Currently, such data must be acquired by means of manual markup. This is both time consuming and biased towards the personal preferences of the markup expert.

Figure 1:
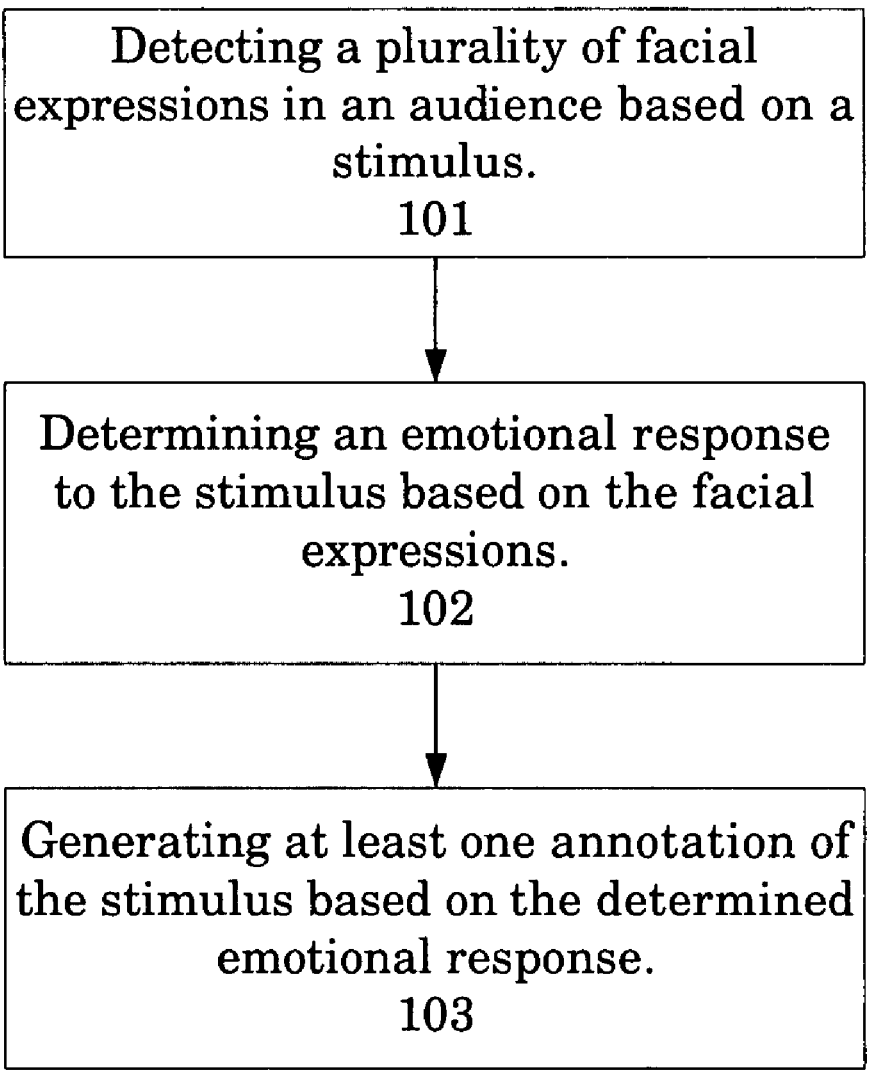
FIG. 1 illustrates a high-level flowchart in accordance with an embodiment of the present invention.

As shown in the drawings for purposes of illustration, a method and system for of annotating audio-visual data is disclosed. In an embodiment, the method and system are designed to create real-time audio-visual annotations while the data is being displayed to an audience. Accordingly, since the annotations are created in real-time, the annotations can be used at the point of collection for various purposes (crowd control, targeted marketing, etc.). Alternatively, the annotations can be indexed and rated to be easily searched and accessed at a later time.

FIG. 1 is a flowchart of a method in accordance with an embodiment. A first step 101 involves detecting a plurality of facial expressions in an audience based on a stimulus. A next step 102 involves determining an emotional response to the stimulus based on the facial expressions. A final step 103 includes generating at least one annotation of the stimulus based on the determined emotional response. Again, by implementing this automated feature, the annotations can be used at the point of collection for various purposes.

For the purposes of this patent application, an annotation is a digital flag associated with a particular point of the stimulus that expresses the audience response in some way. It could be as simple as "how many people are there" or as complex as a list of the locations of all people in the audience and their measured expression at some point in the stimulus. In an embodiment, an annotation indicates the audience's emotional response at a given stimulus point whereby a "stimulus point" may be either a particular time in the playing of the content, or a range of times, so that the annotation may be "the audience found this bit funny" or "the audience found the whole thing funny".

Figure 2:
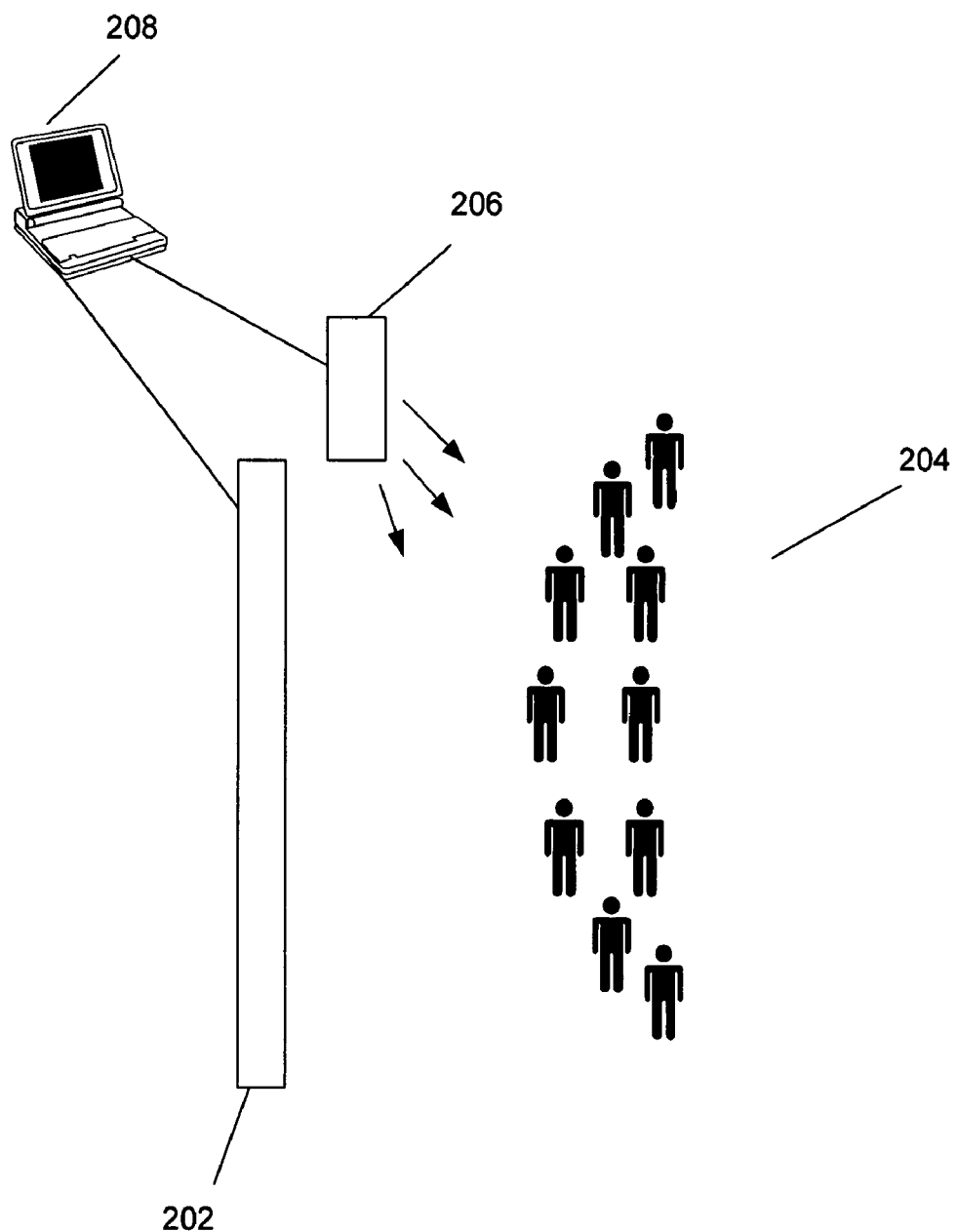
FIG. 2 is an illustration of a system in accordance with an embodiment.

FIG. 2 is an illustration of a system 200 in accordance with an embodiment. The system 200 includes display means 202 for displaying an audio-visual stimulus to an audience 204, video detection means 206 for detecting the facial expressions of the audience and computer processing means 208 for determining an emotional response to the stimulus based on the facial expressions and creating at least one annotation of the stimulus based on the determined emotional response.

In an embodiment, display means 202 is capable of displaying an audio-video stimulus and could be a movie screen, a television screen, advertising billboard or the like. Video detection means 206 includes an image capturing device such as a digital video camera or the like.

In an embodiment, the stimulus could be an audio-visual stimulus such as a marketing ad, a movie, or the like. However, the proposed system could be employed in conjunction with a real-time stimulus such as a sporting event, a speech, or the like. Accordingly, one of ordinary skill in the art will readily recognize that a variety of stimuli could be employed while remaining within the spirit and scope of the present inventive concepts.

The computer processing means 208 may be any type of personal computer, portable computer, or workstation computer that includes a processing unit, a system memory, and a system bus that couples the processing unit to the various components of the computer. The processing unit may include one or more processors, each of which may be in the form of any one of various commercially available processors. Generally, each processor receives instructions and data from a read-only memory and/or a random access memory. The system memory typically includes a read only memory (ROM) that stores a basic input/output system (BIOS) that contains start-up routines for the computer, and a random access memory (RAM). The system bus may be a memory bus, a peripheral bus or a local bus, and may be compatible with any of a variety of bus protocols, including PCI, VESA, Microchannel, ISA, and EISA.

The computer 208 also may include a hard drive, a floppy drive, and CD ROM drive that are connected to the system bus by respective interfaces. The hard drive, floppy drive, and CD ROM drive contain respective computer-readable media disks that provide non-volatile or persistent storage for data, data structures and computer-executable instructions. Other computer-readable storage devices (e.g., magnetic tape drives, flash memory devices, and digital video disks) also may be used with the computer. A user may interact (e.g., enter commands or data) with the computer 208 using a keyboard and a pointing device. Information may be displayed to the user on a monitor or with other display technologies. In some embodiments, the computer 208 also may consist of one or more graphics cards, each of which is capable of driving one or more display outputs that are synchronized to an internal or external clock source.

Figure 3:
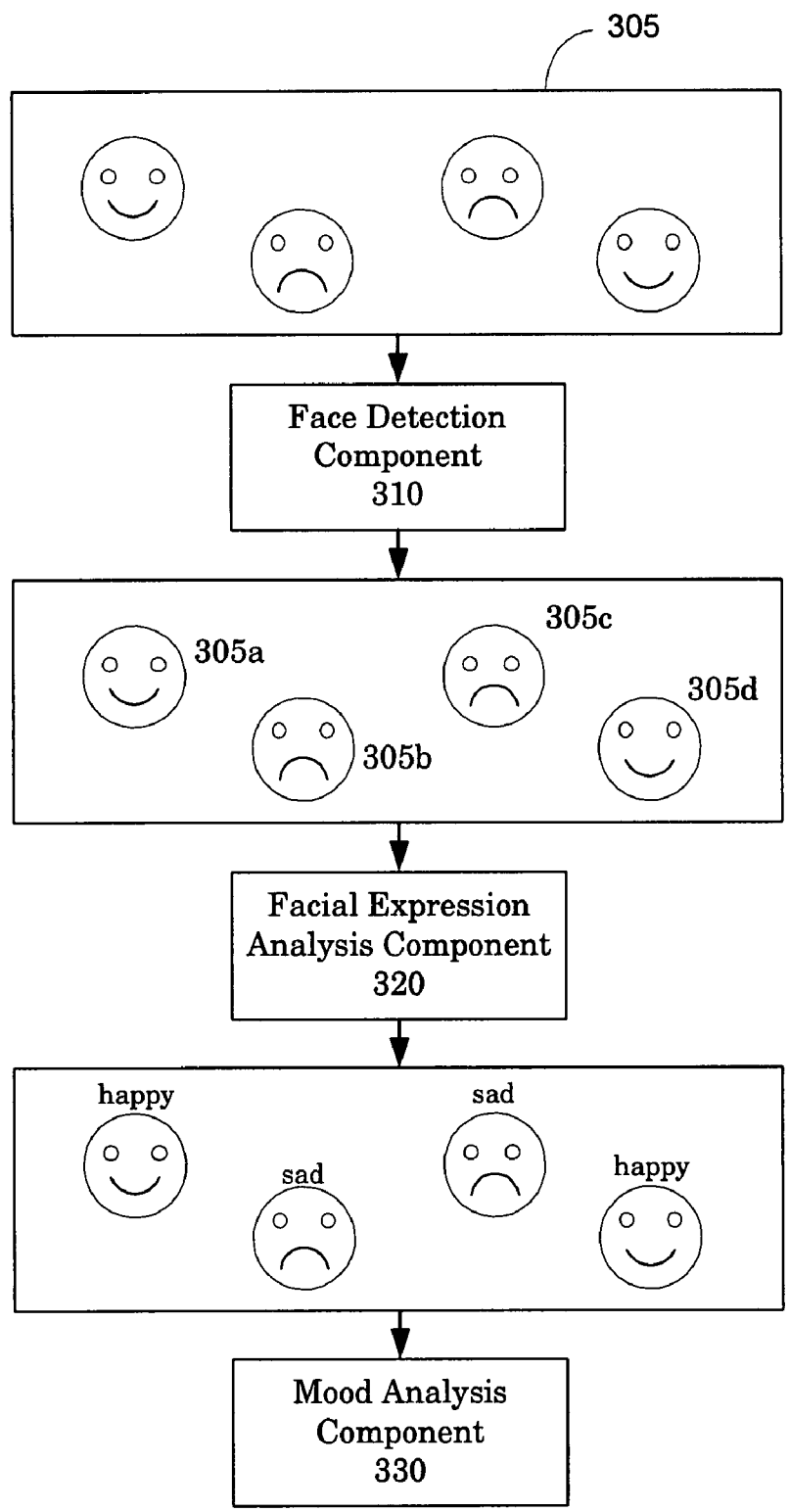
FIG. 3 is an illustration of a sequence in accordance with an embodiment

FIG. 3 is an illustration of a sequence in accordance with an embodiment. Accordingly, a single frame 305 depicting the audience of interest is captured and processed. A face detection component 310 then determines the face locations 305a, 305b, 305c, 305d in the frame 305. These face locations 305a, 305b, 305c, 305d are then sent to an expression analysis component 320 which determines the expression of each detected face. A mood analysis component 330 then collates this information using standard statistical techniques to answer questions like:

What is the overall mood of the group in the video frame?

Is the group mood adequately expressed by a single overall result??

If a single overall result doest not describe the group well, are there localized subgroups with relatively homogeneous moods?

Which individuals differ dramatically from the overall mood, or their local mood?

This analysis is repeated on each frame in a video feed of the audience of interest thereby enabling tracking of the change of group mood over time. Additionally, by clustering the faces in a frame using the distance between them as a measure, subgroups within the crowd can be treated in an identical fashion to the overall group. Consequently, the differing moods of subgroups within the overall group can be tracked.

Figure 4:
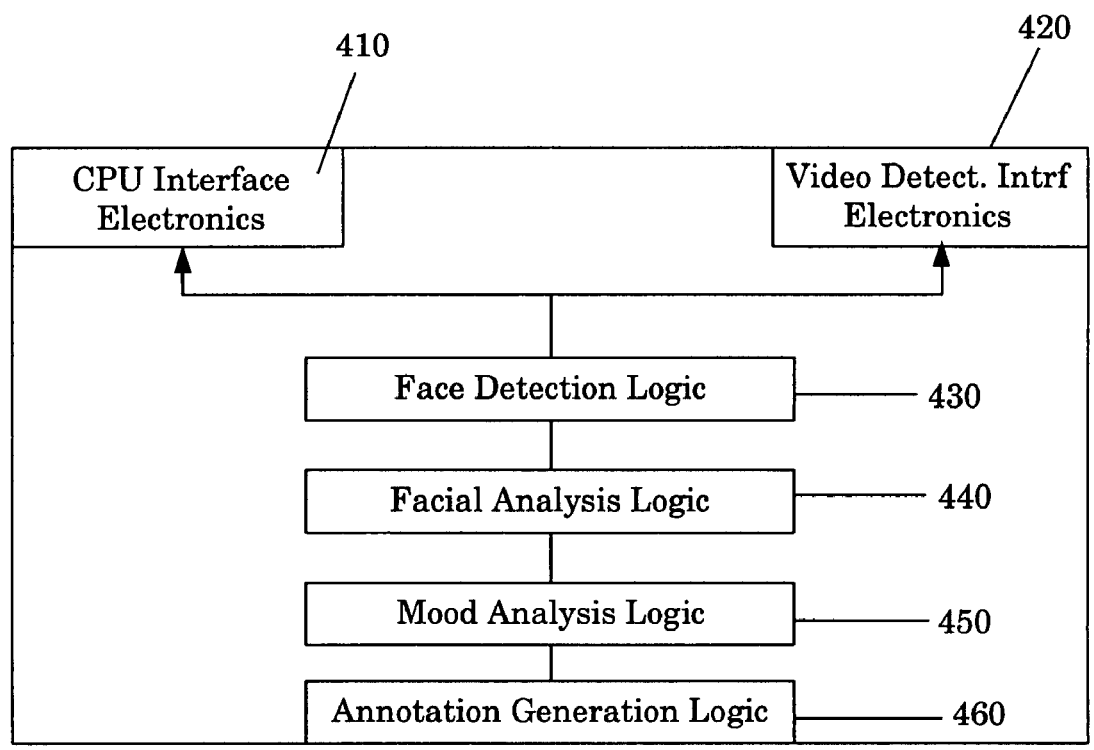
FIG. 4 shows an illustration of the annotation generation module in accordance with an embodiment.

In order to accomplish the above-referenced methodology, an annotation generation module could be employed to interact with a central processing unit (CPU) within the computer 208. Referring now to FIG. 4, an exemplary annotation module 400 is illustrated. The annotation generation module 300 is configured to interact with the video detection means 206 and the CPU of the computer 208. The annotation generation module 400 includes central processing unit (CPU) interface electronics 410, video detection means interface electronics 420, face detection logic 430, facial analysis logic 440, mood analysis logic 450 and annotation generation logic 460. The CPU interface electronics 410 and the video detection means interface electronics 420 are coupled to the face detection logic 430 wherein the face detection logic 430 is further coupled to the facial analysis logic 440. The facial analysis logic 440 is further coupled to the mood analysis logic 450 whereby the mood analysis logic 450 is further coupled to the annotation generation logic 460.

Although the components of the above-described annotation generation module 400 are shown in a specific configuration, one of ordinary skill in the art will readily recognize the components of the annotation module 400 could be configured in a variety of ways while remaining within the spirit and scope of the inventive concepts.

The CPU interface electronics 410 and the video detection means interface electronics 420 include the electronic circuitry employed by the annotation generation module 400 to respectively communicate with the CPU (not shown) and the video detection means 420. The facial detection logic 430 and the facial analysis logic 440 respectively include logic for detecting faces and facial expressions within the audience 204. This can be accomplished by a wide range of methods that are well known to those skilled in the art. Examples of such methods are contained in the article "Real Time Face Detection and Facial Expression Recognition Development and Applications to Human Computer Interaction" by Bartlett et al and appearing in the proceedings of the CVPR, 2004. Accordingly, it should be noted that one of ordinary skill in the art will readily recognize that a variety of techniques could be employed while remaining within the spirit and scope of the present inventive concepts.

The mood analysis logic 450 includes logic for determining an emotional mood of the audience based on the detected facial expressions. In an embodiment, this is accomplished with a simple expedient of agglomerating the instantaneous emotions reflected by individual facial expressions over the audience of interest, and over the time period of interest. There are widely used coding systems, such as the FACS system which associate emotions with particular arrangements of facial muscles. A common set of emotions in expression recognition are joy, sadness, surprise, anger, fear, disgust and neutral. By taking appropriate sample statistics of expressions over a period of time, the mood of that group of individuals over that time period can be appropriately characterized.

The annotation generation logic 460 includes logic for generating at least one annotation of the stimulus based on the determined emotional response. This can be accomplished by associating the determined emotional responses of the audience with a timestamp noting the beginning and end of the response period. A collection of one or more quadruples giving the audience grouping, the start time, the end time and the emotional response may then be used to annotate the original stimulus by synchronizing the timestamps with the time at which the stimulus began being viewed by the audience.

The annotation generation logic 460 also includes logic for indexing the annotation(s) based on the determined emotional response(s) of the audience. This is just the process of maintaining a two-way linkage between the original stimulus and the annotations, so that the annotation quadruples above are augmented with a link to the relevant stimulus. These may be stored according to any standard database methodology, preferably enabling queries such as "all stimuli portions that provoked a response of 5 seconds or more of joy".

As shown in the drawings for purposes of illustration, a method and system for of annotating audio-visual data is disclosed. In an embodiment, the method and system are designed to create real-time audio-visual annotations while the data is being displayed to an audience. Accordingly, since the annotations are created in real-time, the annotations can be used at the point of collection for various purposes (crowd control, targeted marketing, etc.). Alternatively, the annotations can be indexed and rated to be easily searched and accessed at a later time.

The above-described embodiment may also be implemented, for example, by operating a computer system to execute a sequence of computer readable instructions. Accordingly, a computing device typically includes at least some form of computer readable media. Computer readable media can be any available media that can be accessed by computing device. By way of example, and not limitation, computer readable media may include computer storage media and communications media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage device, or any other medium which can be used to store the desired information and which can be accessed by a computing device.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Accordingly, an alternate embodiment includes a computer readable medium having computer executable components for annotating audio-visual data.

Without further analysis, the foregoing so fully reveals the gist of the present inventive concepts that others can, by applying current knowledge, readily adapt it for various applications without omitting features that, from the standpoint of prior art, fairly constitute essential characteristics of the generic or specific aspects of this invention. Therefore, such applications should and are intended to be comprehended within the meaning and range of equivalents of the following claims. Although this invention has been described in terms of certain embodiments, other embodiments that are apparent to those of ordinary skill in the art are also within the scope of this invention, as defined in the claims that follow.

The invention claimed is:

1. A method of indexing a stimulus comprising:
    measuring a plurality of facial expressions in an audience of the stimulus;
    interpreting measurements of the facial expressions using a processor, wherein the processor interpreting the measurements produces a result estimating a mood for a time period of the stimulus, and wherein interpreting measurements of the facial expressions comprises:
        classifying each of the facial expressions as corresponding to an emotion from a set of emotions; and
        statistically analyzing the respective emotions corresponding to the plurality of facial expressions to estimate the mood;
    generating an annotation of the stimulus, wherein the annotation is generated based on the mood estimated;
    repeating the measuring, interpreting, and generating steps to produce a plurality of the annotations that respectively correspond to different time periods of the stimulus; and
    indexing the annotations according to the respective moods, wherein the indexing provides a two-way linkage between the annotations and the time periods of the stimulus.

2. The method of claim 1, wherein the stimulus comprises an audio-video stimulus.

3. The method of claim 1, wherein measuring the plurality of facial expressions comprises:
    scanning the audience in real time; and
    detecting face locations in the audience.

4. The method of claim 1, wherein interpreting the measurements further comprises:
    classifying the moods in real time from the plurality of facial expressions.

5. The method of claim 1, wherein each of the annotations indicates how many people are in the audience.

6. The method of claim 1, wherein the set of emotions includes joy, sadness, surprise, anger, fear, disgust, and neutral.

7. A computer program product for annotating a stimulus, the computer program product comprising a non-transitory computer usable medium having computer readable program means for causing a computer to perform the steps of:
    detecting a plurality of facial expressions in an audience of the stimulus;
    interpreting the facial expressions to estimate a mood for a time period of the stimulus, wherein interpreting the facial expressions comprises:
        classifying each of the facial expressions as corresponding to an emotion from a set of emotions; and
        statistically analyzing the respective emotions corresponding to the plurality of facial expressions to estimate the mood;
    generating an annotation of the stimulus based on the mood estimated;
    repeating the detecting, interpreting, and generating steps to produce a plurality of the annotations that respectively correspond to different time periods of the stimulus; and
    indexing the annotations according to the respective moods, wherein the indexing provides a two-way linkage between the annotations and the time periods of the stimulus.

8. The computer program product of claim 7, wherein the stimulus comprises an audio-video stimulus.

9. The computer program product of claim 7, wherein detecting the plurality of facial expressions comprises:
    scanning the audience in real time; and
    detecting face locations in the audience.

10. The computer program product of claim 7, wherein determining a mood comprises:
    analyzing the plurality of facial expressions; and
    classifying real time emotional responses from the plurality of facial expressions.

11. A system for annotating a stimulus comprising:
    an image capture device; and
    a computer coupled to the image capture device, wherein the computer executes an annotation generation module that interacts with the image capture device, and wherein the annotation generation module comprises logic for performing the steps of:
    detecting a plurality of facial expressions in an audience of the stimulus;
    interpreting the facial expressions to estimate a mood for a time period of the stimulus, wherein interpreting the facial expressions comprises:
        classifying each of the facial expressions as corresponding to an emotion from a set of emotions; and
        statistically analyzing the respective emotions corresponding to the plurality of facial expressions to estimate the mood;
    generating an annotation of the stimulus based on the mood estimated;
    repeating the measuring, interpreting, and generating steps to produce a plurality of the annotations that respectively correspond to different time periods of the stimulus; and
    indexing the annotations according to the respective moods, wherein the indexing provides a two-way linkage between the annotations and the time periods of the stimulus.

12. The system of claim 11, further comprising a display that presents at least a portion of the stimulus to the audience.

13. The system of claim 11, wherein the stimulus comprises an audio-video stimulus.

14. The system of claim 11, wherein detecting a plurality of facial expressions comprises:
    scanning the audience in real time; and
    detecting face locations in the audience.

15. The system of claim 11, wherein interpreting the facial expressions comprises:
    analyzing the plurality of facial expressions; and
    classifying a mood in real time from the plurality of facial expressions.

16. A method of indexing a stimulus, comprising:
    measuring a plurality of facial expressions in an audience of the stimulus;
    interpreting measurements of the facial expressions using a processor, wherein the processor interpreting the measurements produces a result estimating a mood for a time period of the stimulus;
    generating an annotation of the stimulus, wherein the annotation is generated based on the mood estimated;
    repeating the measuring, interpreting, and generating steps to produce a plurality of the annotations that respectively correspond to different time periods of the stimulus;
    indexing the annotations according to the respective moods, wherein the indexing provides a two-way linkage between the annotations and the time periods of the stimulus employing a query that indicates a mood; and
    using the indexing of the annotations to find in the stimulus a time period that is linked to the mood indicated in the query.

* * * * *